United States Patent
Marks et al.

(10) Patent No.: US 11,632,975 B2
(45) Date of Patent: Apr. 25, 2023

(54) LIQUID DIETARY FIBER PRODUCTS AND METHODS OF MAKING AND USING THE SAME

(71) Applicant: MEDTRITION INC., Lancaster, PA (US)

(72) Inventors: David Marks, Lititz, PA (US); Keith A. Garleb, Westerville, OH (US)

(73) Assignee: MEDTRITION INC., Lancaster, PA (US)

( * ) Notice: Subject to any disclaimer, the term of this patent is extended or adjusted under 35 U.S.C. 154(b) by 185 days.

(21) Appl. No.: 17/109,899

(22) Filed: Dec. 2, 2020

(65) Prior Publication Data

US 2022/0167653 A1 Jun. 2, 2022

(51) Int. Cl.
- *A23L 33/22* (2016.01)
- *A23L 29/269* (2016.01)
- *A23L 29/231* (2016.01)
- *A23L 33/00* (2016.01)

(52) U.S. Cl.
CPC ............. *A23L 33/22* (2016.08); *A23L 29/231* (2016.08); *A23L 29/272* (2016.08); *A23L 29/273* (2016.08); *A23L 33/30* (2016.08)

(58) Field of Classification Search
CPC ........ A23L 33/22; A23L 29/273; A23L 33/30; A23L 29/231; A23L 29/272
USPC ........................................................ 426/577
See application file for complete search history.

(56) References Cited

FOREIGN PATENT DOCUMENTS

| CN | 102178291 A | * | 9/2011 |
| CN | 105249072 A | * | 1/2016 |

OTHER PUBLICATIONS

Translation of CN-105249072-A (Year: 2016).*
Translation of CN-102178291-A (Year: 2011).*
Fraeye et al., "Influence of pectin properties and process conditions on thermal pectin degradation", Food Chemistry, vol. 105, pp. 555-563 (2007).
Klewicki, "The stability of gal-polyols and oligosaccharides during pasteurization at a low pH", LWT, vol. 40, pp. 1259-1265 (2007).

* cited by examiner

*Primary Examiner* — Brent T O'Hern
(74) *Attorney, Agent, or Firm* — McNees Wallace & Nurick LLC

(57) ABSTRACT

A liquid dietary fiber product includes dietary fiber in an aqueous liquid at a concentration of at least 5 g of the dietary fiber per 60 mL of the aqueous liquid. The dietary fiber is from at least three dietary fiber sources. A process of forming a single-serve liquid dietary fiber product includes combining dietary fiber with an aqueous liquid at a concentration of at least 5 g of the dietary fiber per 60 mL of the aqueous liquid to form a liquid dietary fiber product. The dietary fiber is from at least three dietary fiber sources. The process also includes sterilizing the liquid dietary fiber product and containing the liquid dietary fiber product in a single-serve packet to form the single-serve liquid dietary fiber product.

20 Claims, No Drawings

__US 11,632,975 B2__

LIQUID DIETARY FIBER PRODUCTS AND METHODS OF MAKING AND USING THE SAME

FIELD OF THE INVENTION

This application is directed to dietary fiber supplements. More particularly, the present application is directed to a liquid, low viscosity, shelf stable product containing a blend of soluble, fermentable dietary fiber in a single serve packet.

BACKGROUND OF THE INVENTION

Dietary fiber is an important component of a healthy diet. The Society of Critical Care Medicine and the American Society for Parenteral and Enteral Nutrition recommend that 10-20 g of a soluble, fermentable fiber supplement be given in divided doses over 24 hours as adjunctive therapy if there is evidence of diarrhea. They also recommend that the routine use of a soluble fiber additive be considered for all Intensive Care Unit (ICU) patients as a prophylactic measure to help maintain commensal microbiota and promote bowel health.

A conventional method to deliver dietary fiber is to provide it as part of the enteral formula being tube fed to the patient. However, using this route makes it difficult to tailor the fiber dose to the needs of the individual patient. Altering the dose of dietary fiber requires changes in the flow rate (administration rate) of the tube fed formula and would also alter the dose of macronutrients (protein, fat, carbohydrate) and micronutrients (vitamins and minerals), which may not be appropriate for the patient.

A conventional form of a dietary fiber supplement is a powder. A number of powdered fiber supplements are commercially available. Such commercial powders include one including banana flakes and a transgalactooligosaccharide prebiotic as the fiber source and marketed by Medtrition, Inc. (Lancaster, Pa.) under the tradename Banatrol® Plus Powder, one including psyllium as the fiber source and marketed by Procter & Gamble (Cincinnati, Ohio) under the tradename Metamucil®, and one including wheat dextrin as the fiber source and marketed by GSK Consumer Healthcare S.A. (Prangins, Switzerland) under the tradename Benefiber®.

Powdered products can sometimes be inconvenient, such as mixing at bedside prior to administration. This takes additional nursing time and increases the risk of microbial contamination. This approach also requires the administration of larger volumes of fluid. Mixing directions for psyllium include 3.4 g psyllium powder in 240 mL water. Mixing directions for wheat dextrin include 4 g wheat dextrin powder in 120 to 240 mL water. Mixing directions for Banatrol® Plus Powder include 2 g of powder in 120 mL water.

Another conventional form of a dietary fiber supplement is a liquid. A number of liquid fiber supplements are commercially available. Such commercial liquids include one including polydextrose and inulin as the fiber source at 15 g/30 mL and marketed by Nutritional Designs (Lynbrook, N.Y.) under the tradename Liquid Fiber Flow™, one including polydextrose and fructooligosaccharides as the fiber source at 12 g/30 mL and marketed by Inspired Health Products, LLC (Irvine, Calif.) under the tradename Ready Fiber® Prebiotic Liquid Supplement, one including resistant maltodextrin and fructooligosaccharides as the fiber source at 10 g/30 mL and marketed by Nature's Way Products, LLC (Green Bay, Wis.) under the tradename Alive!® Liquid Fiber, one including inulin as the fiber source at 14 g/30 mL and marketed by Trace Minerals Research LC (West Haven, Utah), one including polydextrose and inulin as the fiber source at 14 g/30 mL and marketed by Nature's Answer, Inc. (Hauppauge, N.Y.), and one including polydextrose and fructooligosaccharides as the fiber source at 12 g/30 mL marketed by Medtrition, Inc. (Lancaster, Pa.) under the tradename HyFiber®.

BRIEF DESCRIPTION OF THE INVENTION

In an embodiment, a liquid dietary fiber product includes dietary fiber in an aqueous liquid at a concentration of at least 5 g of the dietary fiber per 60 mL of the aqueous liquid. The dietary fiber is from at least three dietary fiber sources.

In another embodiment, a process of forming a single-serve liquid dietary fiber product includes combining dietary fiber with an aqueous liquid at a concentration of at least 5 g of the dietary fiber per 60 mL of the aqueous liquid to form a liquid dietary fiber product. The dietary fiber is from at least three dietary fiber sources. The process also includes sterilizing the liquid dietary fiber product and containing the liquid dietary fiber product in a single-serve packet to form the single-serve liquid dietary fiber product.

Other features and advantages of the present invention will be apparent from the following more detailed description of exemplary embodiments that illustrate, by way of example, the principles of the invention.

DETAILED DESCRIPTION OF EXEMPLARY EMBODIMENTS

In exemplary embodiments, a liquid dietary fiber product includes dietary fiber from at least three different dietary fiber sources. In some embodiments, a liquid dietary fiber product includes dietary fiber from at least four different dietary fiber sources.

In exemplary embodiments, a liquid dietary fiber product has a low viscosity, is shelf stable and contains a blend of soluble, fermentable dietary fiber in a single serve packet.

As used herein, "dietary fiber" refers to the edible parts of plants or analogous carbohydrates that are resistant to digestion and absorption in the human small intestine, with complete or partial fermentation in the large intestine. Dietary fiber may be further categorized by solubility and fermentability. Soluble fibers are fibers that dissolve in water. Fermentable fibers are fibers that can be fermented by the microbiota in the large bowel.

As used herein, "low viscosity" refers to a viscosity less than 250 centipoise (cps).

As used herein, "shelf stable" refers to a product that is sterile without concern of microbial growth in the packaged product for at least one year at room temperature. Once adequately sterilized, the product may remain sterile indefinitely.

In exemplary embodiments, a liquid dietary fiber product includes a 60-mL liquid shelf stable product containing 5 g of dietary fiber in a single serve packet for easy and convenient delivery to tube-fed patients. A liquid dietary fiber product of at least 5 g dietary fiber/60 mL in a single serve packet easily and conveniently permits delivery of divided doses over a 24-hr period.

Appropriate dietary fiber sources are stable under the processing conditions necessary to sterilize the final product. Appropriate dietary fiber sources may include, but are not limited to banana flakes, galactooligosaccharides (GOS), short-chain fructooligosaccharides (scFOS), resistant maltodextrin, amidated low methoxy pectin, gellan gum, inulin, polydextrose, or any combination thereof.

Unexpectedly, a liquid dietary fiber product containing 5 g fiber/60 mL was formed having shelf stability, minimal settling of particulate matter, and low viscosity, where banana flakes was the ingredient present in the highest amount. Higher viscosities and excessive particulate matter that would settle out in the product had been expected. This provided a product advantageous to the scientific data on bananas concerning the treatment of diarrhea and certain consumer data professing the benefits of such a dietary fiber source. The liquid version is easier to administer than a powder, thereby offering considerable benefit to the nursing staff. Additionally, the liquid dietary fiber product is low enough in viscosity that it can be administered via an enteral feeding tube.

In exemplary embodiments, a separate heat treatment of the banana flakes is unnecessary for shelf stability. In exemplary embodiments, the retort sterilization of the liquid formulation provides a heat treatment to the banana flakes. During the retort sterilization, the RS2-type resistant starch in banana flakes is converted to digestible starch and the banana flakes are converted to heat-treated banana flakes. In exemplary embodiments, banana flakes and/or heat treated banana flakes is present in the liquid dietary fiber product in an amount greater than any other dietary fiber source.

In exemplary embodiments, the dietary fiber source for the GOS is a Bimuno® prebiotic supplement (Clasado IP LTD, St. Helier, Jersey), which contains at least 80% galactooligosaccharides and about 57% dietary fiber on a dry matter basis.

In exemplary embodiments, the dietary fiber source for the scFOS is a Nutraflora® P-95 prebiotic fiber (Corn Products Development, Inc., Westchester, Ill.), which contains about 95% short-chain fructooligosaccharides and about 95% dietary fiber on a dry matter basis.

In exemplary embodiments, the dietary fiber source for the resistant maltodextrin is Fibersol®-2 soluble corn fiber (ADM/Matsutani LLC, Decatur, Ill.). Fibersol®-2 soluble corn fiber contains at least 90% dietary fiber on a dry matter basis and may be used in a liquid dietary fiber product to replace the resistant starch lost during heat sterilization of banana flakes and to fortify the liquid dietary fiber product with soluble fiber.

In exemplary embodiments, the dietary fiber source for the amidated low methoxy pectin is Apple Pectin LMA (TIC Gums, White Marsh, Md.), which is about 72.5% dietary fiber on a dry matter basis. Amidated low methoxy pectin forms a gel network in the presence of calcium. Calcium in the gastrointestinal tract reacts with this pectin to increase viscosity of gut contents. This may help slow the flow of chyme through the gastrointestinal tract, improving water absorption and thereby reducing watery stools. Amidated low methoxy pectin may be added to replace the soluble fiber in formulas with reduced banana flake levels relative to a commercially-available powdered Banatrol® product.

In exemplary embodiments, the dietary fiber source for the gellan gum is Gellan Gum LT100 (Modernist Pantry LLC, Portsmouth, N.H.), which may serve as a stabilizer in a liquid dietary fiber product.

The packet containing the liquid dietary fiber product may be any appropriate sealed packaging, including, but not limited to, a bottle, a can, or a pouch.

The packet may contain any appropriate volume of liquid dietary fiber product. An appropriate volume of liquid dietary fiber product may be a single serving and may include, but is not limited to, about 45 mL to about 60 mL, alternatively about 45 mL, alternatively about 60 mL, or any value, range, or sub-range therebetween.

The single-serve liquid dietary fiber product may contain any appropriate total amount of dietary fiber. An appropriate amount of dietary fiber may include, but is not limited to, at least 4 grams, about 4 to about 6 grams, about 4.5 to about 5.5 grams, about 5 grams, or any value, range, or sub-range therebetween.

In some embodiments, the concentration of dietary fiber is at least 5 g per 60 mL of aqueous liquid, alternatively at least 5 g per 45 mL of aqueous liquid, or any value, range, or sub-range therebetween.

In some embodiments, the first dietary fiber source, providing the most dietary fiber, provides, by weight, about 66% or less, alternatively about 50% to about 66%, or any value, range, or sub-range therebetween, of the total dietary fiber in the liquid dietary fiber product. In some embodiments, the second dietary fiber source provides, by weight, about 15% or more, alternatively about 15% to about 30%, alternatively about 19% to about 25%, or any value, range, or sub-range therebetween, of the total dietary fiber. In some embodiments, the third dietary fiber source provides, by weight, about 5% or more, alternatively about 5% to about 20%, alternatively about 9% to about 15%, or any value, range, or sub-range therebetween, of the total dietary fiber. In some embodiments, the fourth dietary fiber source, if present, provides, by weight, about 4% or more, alternatively about 4% to about 10%, alternatively about 6% to about 8%, or any value, range, or sub-range therebetween, of the total dietary fiber.

In some embodiments, the first dietary fiber source includes resistant maltodextrin. In some embodiments, the second dietary fiber source includes galactooligosaccharides. In some embodiments, the third dietary fiber source includes banana flakes. In some embodiments, the fourth dietary fiber source includes amidated low methoxy pectin.

In some embodiments, the aqueous liquid is water. In other embodiments, the aqueous liquid is a buffer solution. In some embodiments, the buffer solution is a 0.05 M citrate buffer having a pH of about 4.

In exemplary embodiments, the liquid dietary fiber product contains one or more additives. In some embodiments, the additive is calcium in an amount in the range of about 30 mg to about 90 mg.

The liquid dietary fiber product can be formulated at a viscosity suitable for delivery through a feeding tube. An appropriate viscosity for the liquid dietary fiber product may be less than 250 cps, alternatively less than 225 cps, alternatively less than 200 cps, alternatively less than 175 cps, alternatively less than 150 cps, or any value, range, or sub-range therebetween. The formulated viscosity may be further adjusted by lowering the level of gellan gum, lowering the overall level of fiber, or altering the reconstitution rate (60 mL rather than 45 mL).

In exemplary embodiments, a process of forming a single-serve liquid dietary fiber product includes combining dietary fiber with an aqueous liquid at a concentration of at least 5 g of the dietary fiber per 60 mL of the aqueous liquid to form a liquid dietary fiber product. The dietary fiber is from at least three dietary fiber sources. The process also includes sterilizing the liquid dietary fiber product and containing the liquid dietary fiber product in a single-serve packet to form the single-serve liquid dietary fiber product.

In some embodiments, the sterilizing includes hot fill processing.

In some embodiments, the sterilizing includes retort processing.

EXAMPLES

The invention is further described in the context of the following examples which are presented by way of illustration, not of limitation.

Fiber Sources

Seven different commercially-available fiber sources were evaluated for their compositional makeup for consideration in a liquid dietary fiber supplement. The seven sources were banana flakes (Diana Food SAS, Antrain, France), banana flakes that had been heat-treated (BF HT), Bimuno® prebiotic supplement (Clasado IP LTD, St. Helier, Jersey) containing galactooligosaccharides (B-GOS), Nutraflora® P-95 prebiotic fiber (Corn Products Development, Inc., Westchester, Ill.) short-chain fructooligosaccharides (scFOS), Fibersol®-2 soluble corn fiber (ADM/Matsutani LLC, Decatur, Ill.) containing resistant maltodextrin, Apple Pectin LMA (TIC Gums, White Marsh, Md.) containing amidated low methoxy pectin (Pectin LMA), and Gellan Gum LT100 (Modernist Pantry LLC, Portsmouth, N.H.) containing gellan gum with a high acyl content. The components of the seven dietary fiber sources are shown in TABLE 1.

TABLE 1

Composition of Ingredients of Fiber Sources (in g/100 g dry matter)

| | Banana Flakes | BF HT | B-GOS | scFOS | Fibersol-2 | Pectin LMA | Gellan Gum |
|---|---|---|---|---|---|---|---|
| Organic matter | 96.9 | 96.9 | 96.0 | 100.0 | 100.0 | 97.8 | 99.0 |
| Ash | 3.1 | 3.1 | 4.0 | 0.0 | 0.0 | 2.2 | 1.0 |
| Total DF | 10.1 | 10.1 | 57.0 | 95.0 | 90.0 | 72.5 | 87.0 |
| Insoluble DF | 3.6 | 3.6 | 0.0 | 0.0 | 0.0 | 0.0 | 0.0 |
| Soluble DF | 6.5 | 6.5 | 57.0 | 95.0 | 90.0 | 72.5 | 87.0 |
| Total Starch | 35.0 | 35.0 | 0.0 | 0.0 | 0.0 | 0.0 | 0.0 |
| Resistant starch | 13.5 | 0.0 | 0.0 | 0.0 | 0.0^ | 0.0 | 0.0 |
| Digestible starch | 21.5 | 35.0 | 0.0 | 0.0 | 0.0 | 0.0 | 0.0 |
| Protein | 3.7 | 3.7 | 0.0 | 0.0 | 0.0 | 0.0 | 12 |
| Fat | 0.3 | 0.3 | 0.0 | 0.3 | 0.0 | 0.3 | 0.0 |
| Total sugar | 44.7 | 44.7 | 17.0 | 5.0 | 2.0 | 26.2 | 0.0 |

The data for banana flakes was based on analytical work conducted by the University of Illinois. The total dietary fiber analysis for banana flakes did not include resistant starch. Resistant starch was determined directly for banana flakes. For heat-treated banana flakes, the resistant starch was assumed to convert completely to digestible starch during retort processing. Data on the remaining fiber sources is based on the manufacturers' information. 100 grams of B-GOS provides 79 grams of galactooligosaccharides, of which 57 grams can be labelled as dietary fiber. Fibersol-2 is a resistant maltodextrin. The digestion resistant material of Fibersol-2 is included in the total DF and soluble DF rows. The composition for gellan gum is based on data from the Nutrition Facts Panel on the label.

TABLE 1 shows that banana flakes have a much lower fiber content than the other fiber sources shown in TABLE 1. Although banana flakes are present in the liquid dietary fiber product in an amount greater than any other dietary fiber source in exemplary embodiments, the banana flakes do not provide the most fiber content of the fiber sources in the liquid dietary fiber product in most embodiments. An appropriate amount of fiber, by weight, provided by the banana flakes is about 5% or greater, alternatively about 5% to about 20%, alternatively about 9% or greater, alternatively about 9% to about 15%, or any value, range, or sub-range therebetween.

Experiment 1

Six different Examples were formulated to evaluate the effect of retort processing on the physical stability of formulations containing varying levels of banana flakes and reconstituted with 60 mL of deionized water. The fiber source amounts and total dietary fiber for Examples 1-6 are shown in TABLE 2. The total fiber includes the total dietary fiber and resistant starch.

TABLE 2

Liquid Dietary Fiber Formulations (in g/60 mL DI water)

| | Ex. 1 | Ex. 2 | Ex. 3 | Ex. 4 | Ex. 5 | Ex. 6 |
|---|---|---|---|---|---|---|
| Banana Flakes | 9.03 | 9.03 | 6.77 | 4.52 | 2.26 | 0.00 |
| scFOS | 1.05 | 1.05 | 1.05 | 1.05 | 1.05 | 1.05 |
| Fibersol-2 | 1.40 | 3.50 | 3.50 | 3.60 | 3.60 | 3.70 |
| Pectin LMA | 0.00 | 0.00 | 0.25 | 0.50 | 0.75 | 1.00 |
| Total fiber | 3.17 | 5.06 | 5.01 | 5.06 | 5.01 | 5.05 |

240 mL of each Example was prepared and then homogenized for 15 seconds using a hand blender. After homogenization, approximately 2.5 oz (75 mL) was added to 4-oz jars. The jars were sealed and placed into a stove top pressure canner to simulate retort processing. Examples were processed for 1 hour at 10 lbs of pressure and at a temperature greater than 240° F.

All Examples containing banana flakes (Ex. 1-Ex. 5) darkened due to the thermal process. These Examples had some degree of phase separation and the presence of particulate matter. Examples 3, 4, and 5 appeared to have much less particulate matter. All the banana flake Examples could be easily suspended with modest shaking. Due to the absence of banana flakes, Examples 6 had no phase separation or particulate matter. The effect of soluble calcium on the viscosity of the Examples was also evaluated. This simulates actions in the body and enabled testing of viscosity build up. Soluble calcium was made by acidifying calcium carbonate with acetic acid. An increase in viscosity was noted in the Examples that contained Pectin LMA.

All Examples appeared viable for further product development. The next step involved increasing the concentration of all formulas by reconstituting with only 45 mL rather than 60 mL of deionized water.

Experiment 2

The same six Examples of TABLE 2 were reformulated as Examples 1A-6A in 45 mL of deionized water rather than 60 mL of deionized water.

225 mL of each Example was prepared and then homogenized for 15 seconds using a hand blender. After homogenization, approximately 2.5 oz (75 mL) was added to 4-oz jars. The jars were sealed and placed into a stove top pressure canner to simulate retort processing. Examples were processed for 1 hour at 10 lbs of pressure.

There was an increase in particulates in the Examples as a function of the banana flake level. However, particulate in all Examples could be resuspended with modest shaking. After shaking, Examples were allowed to set for several days, during which time the particulates settled out of suspension. The level of sedimentation was a function of the amount of banana flakes in the formula.

In this experiment the effect of soluble calcium on the viscosity of the Examples was also evaluated. Soluble calcium was made by acidifying calcium carbonate with acetic acid. An increase in viscosity was noted in formulas that contained Pectin LMA.

Experiment 3

Three different Examples were formulated to evaluate the presence of gellan gum in the Example. The formulas for these Examples were similar to Examples 4 and 4A except with three different levels of gellan gum. The fiber source amounts and total dietary fiber for Examples 7-9 are shown in TABLE 3. The total fiber includes the total dietary fiber and resistant starch.

TABLE 3

Liquid Dietary Fiber Formulations Including Gellan Gum (in g/45 mL DI water)

|  | Ex. 7 | Ex. 8 | Ex. 9 |
|---|---|---|---|
| Banana Flakes | 4.52 | 4.52 | 4.52 |
| scFOS | 1.05 | 1.05 | 1.05 |
| Fibersol-2 | 3.60 | 3.60 | 3.60 |
| Pectin LMA | 0.50 | 0.50 | 0.50 |
| Gellan Gum | 0.009 | 0.0135 | 0.018 |
| Total Fiber | 5.06 | 5.07 | 5.07 |

225 mL of each Example was prepared and then homogenized for 15 seconds using a hand blender. After homogenization, approximately 2.5 oz (75 mL) was added to 4-oz jars. The jars were sealed and placed into a stove top pressure canner to simulate retort processing. Examples were processed for 1 hour at 10 lbs of pressure and at a temperature greater than 240° F.

All Examples were low in viscosity and mild shaking easily suspended the Examples, forming a homogeneous solution. The presence of gellan gum appeared to help reduce or slow sedimentation, and all three levels were similarly effective. In this experiment the effect of soluble calcium on the viscosity of the Examples was also evaluated. Soluble calcium was made by acidifying calcium carbonate with acetic acid. An increase in viscosity was noted in the Examples, because they contained Pectin LMA. The level of gellan gum also affected viscosity after the addition of soluble calcium, with a higher level of gellan gum producing a higher level of viscosity. Gellan gum was observed to be synergizing with Pectin LMA.

Experiment 4

The fiber source combination of Example 9 was placed in a citrate buffer as Example 9A instead of deionized water to evaluate the impact of a high acid hot fill process.

225 mL of the Example was prepared. A citrate buffer (0.05 M solution at pH 4) was used to prepare Example 9A. Example 9A was homogenized for 15 seconds using a hand blender and heated to 165° F. After heating, approximately 2.5 oz of Example 9A (75 mL) was added to 4 oz jars. The jars were sealed and placed into a stove top water bath to simulate "hot fill" processing. Example 9A was processed for 40 minutes in the boiling water bath.

Carbohydrates are susceptible to acid hydrolysis. Low pH and high temperatures could result in degradation of the bioactive components in a liquid dietary fiber supplement. According to information provided by ADM/Matsutani, Fibersol-2 is resistant to degradation under "high acid hot fill" processing conditions typically used in the food industry. Pectin LMA is also stable under these conditions (see, for example, Fraeye et al., "Influence of pectin properties and process conditions on thermal pectin degradation", *Food Chemistry*, Vol. 105, pp. 555-563 (2007)). While both GOS and FOS are degraded under low pH and high temperature conditions, GOS is much more stable to high acid hot fill processing conditions compared to FOS (see, for example, Klewicki, "The stability of gal-polyols and oligosaccharides during pasteurization at a low pH", *LWT*, Vol. 40, pp. 1259-1265 (2007)).

Example 9A is much lighter in color than those processed using retort. There was only minimal settling and the formula suspended into a homogeneous solution with modest shaking. Example 9A had a smooth texture and was more viscous than the retorted formulas. Soluble calcium was made by acidifying calcium carbonate with acetic acid. The addition of soluble calcium increased the viscosity of Example 9A, confirming that the Pectin LMA remained intact following the high acid hot fill process.

Experiment 5

Four different Examples were formulated to evaluate the impact of processing, oligosaccharide source, and calcium source. The first two were the previously-discussed Examples 9 and 9A. In the third Example, Example 10, the scFOS was replaced with B-GOS in the amount shown in TABLE 4. The fourth Example, Example 10A included the same dietary fiber sources amounts as in Example 10 but in citrate buffer instead of deionized water.

TABLE 4

Liquid Dietary Fiber Formulation Including B-GOS (in g/45 mL DI water)

|  | Ex. 10 |
|---|---|
| Banana Flakes | 4.52 |
| B-GOS | 1.72 |
| Fibersol-2 | 3.60 |
| Pectin LMA | 0.50 |
| Gellan Gum | 0.018 |
| Total fiber | 5.06 |

450 mL of each Example was prepared. Deionized water was used to prepare Example 9 and Example 10 for retort processing, whereas a citrate buffer (0.05 M solution at pH 4) was used to prepare Example 9A and Example 10A for hot fill processing. The Examples were homogenized for 30 seconds using a hand blender. The Examples for hot fill processing were heated to 165° F., after which approximately 2.5 oz (75 mL) was added to 4 oz jars. The jars were sealed and placed into a stove top water bath to simulate hot fill processing. The Examples for hot fill processing were processed for 40 minutes in the boiling water bath. For the Examples for retort processing, approximately 2.5 oz (75 mL) was added to 4 oz jars. The jars were sealed and placed into a stove top pressure canner to simulate retort processing. The Examples for retort processing were processed for 1 hour at 10 lbs of pressure and at a temperature greater than 240° F.

The pH of Example 9 and Example 10 was 5.5 after processing, whereas the pH of Example 9A and Example 10A was 4.0 after processing. Example 9 and Example 10 were darker and less viscous after processing than Example 9A and Example 10A. The oligosaccharide source had no discernible effect on the appearance of the products.

The impact of calcium source on viscosity was also evaluated. Two sources of calcium were tested, including an insoluble source, calcium carbonate (40% calcium), and a soluble source, calcium chloride (36% calcium). Sixty mg of calcium was tested (as 150 mg calcium carbonate or 166 mg calcium chloride). The presence of calcium carbonate had no discernible impact on the viscosity of the retorted formulas. The presence of calcium carbonate did, however, increase the viscosity of Example 9A and Example 10A to the solubilization of this calcium source by the low pH. The presence of calcium chloride increased the viscosity of all four Examples with a greater increase noted with Example 9A and Example 10A than Example 9 and Example 10.

Tube flow characteristics were evaluated using a Kangaroo™ 12F nasogastric feeding tube and irrigation kit (Cardinal Health, Inc., Dublin, OH). Example 10 and Example 10A were evaluated. Both Examples were successfully administered through the tube.

Both retort processing and hot fill processing resulted in a viable liquid dietary fiber product that is administrable via a feeding tube. The viscosity of the Examples increased in the presence of soluble calcium. The selection of scFOS or B-GOS positively affected the physical attributes of the formula. Due to its resistance to hydrolysis under high acid hot fill processing conditions, B-GOS is preferred.

Experiment 6

Example 10A was formulated to evaluate its potential as a thickened oral supplement. Commercially-available flavor packets containing varying levels of calcium were used to thicken Example 10A.

900 mL of Example 10A was prepared. Example 10A was homogenized for 30 seconds using a hand blender. Example 10A was heated to 165° F., after which approximately 2.5 oz (75 mL) was added to 4 oz jars. The jars were sealed and placed into a stove top water bath to simulate hot fill processing. Example 10A was processed for 40 minutes in the boiling water bath.

As in Experiment 5, Example 10A was a smooth, homogeneous, slightly viscous product with a pH of 4. Four different flavor packets were added to four 90-mL amounts of Example 10A. Flavor Packet 1 was a 500 mg powder including 83.1 mg of calcium chloride. Flavor Packet 2 was a 500 mg powder including 166.2 mg of calcium chloride. Flavor Packet 3 was a 500 mg powder including 249.3 mg of calcium chloride. Flavor Packet 4 was a 2.5 mL liquid including 166.2 mg of calcium chloride. All flavor packets caused gelling and an increase in viscosity of Example 10A immediately after adding. In all four cases, Example 10A was extremely gelatinous by 30 min after adding the flavor packet. Flavor Packets 2 and 3, due to their higher level of calcium, produced a greater level of viscosity than Flavor Packet 1. Flavor Packet 4 mixed well, forming a smoother, thickened product compared to Flavor Packets 1-3. This was likely because the calcium was solubilized prior to its addition to Example 10A.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A liquid dietary fiber product comprising:
    dietary fiber in an aqueous liquid at a concentration of at least 5 g of the dietary fiber per 60 mL of the aqueous liquid, wherein the dietary fiber is from at least three dietary fiber sources.
2. The liquid dietary fiber product of claim 1, wherein the at least three dietary fiber sources are selected from the group consisting of banana flakes, galactooligosaccharides, short-chain fructooligosaccharides, resistant maltodextrin, amidated low methoxy pectin, and gellan gum.
3. The liquid dietary fiber product of claim 1, wherein the at least three dietary fiber sources is at least four dietary fiber sources.
4. The liquid dietary fiber product of claim 1, wherein one of the at least three dietary fiber sources is banana flakes.
5. The liquid dietary fiber product of claim 4, wherein the banana flakes are present in an amount, by weight, greater than any other of the at least three dietary fiber sources.
6. The liquid dietary fiber product of claim 4, wherein the banana flakes provide at least 5%, by weight, of the dietary fiber in the liquid dietary fiber product.
7. The liquid dietary fiber product of claim 1, wherein the concentration is at least 5 g of the dietary fiber per 45 mL of the aqueous liquid.
8. The liquid dietary fiber product of claim 1, wherein the aqueous liquid is water.
9. The liquid dietary fiber product of claim 1, wherein the aqueous liquid comprises a citrate buffer.
10. The liquid dietary fiber product of claim 1 further comprising a packet sealed and containing the dietary fiber in the aqueous liquid.
11. The liquid dietary fiber product of claim 10, wherein the packet is a single-serve packet.
12. The liquid dietary fiber product of claim 1 further comprising at least 30 mg of calcium per 60 mL of the aqueous fluid.
13. The liquid dietary fiber product of claim 10, wherein the liquid dietary fiber product is shelf stable.
14. The liquid dietary fiber product of claim 1, wherein the liquid dietary fiber product has a viscosity of less than 250 centipoise at room temperature.
15. A process of forming a single-serve liquid dietary fiber product comprising:
    combining dietary fiber with an aqueous liquid at a concentration of at least 5 g of the dietary fiber per 60 mL of the aqueous liquid to form a liquid dietary fiber product, wherein the dietary fiber is from at least three dietary fiber sources;
    sterilizing the liquid dietary fiber product; and
    containing the liquid dietary fiber product in a single-serve packet to form the single-serve liquid dietary fiber product.
16. The process of claim 15, wherein one of the at least three dietary fiber sources is banana flakes.
17. The process of claim 16, wherein the banana flakes are present in an amount, by weight, greater than any other of the at least three dietary fiber sources.
18. The process of claim 15, wherein the sterilizing comprises retort processing the liquid dietary fiber product.

19. The process of claim 15, wherein the single-serve liquid dietary fiber product is shelf stable in the single-serve packet.

20. The process of claim 15, wherein the single-serve liquid dietary fiber product has a viscosity of less than 250 centipoise at room temperature.

* * * * *